June 14, 1949.  C. G. NYMAN  2,472,918
AIRCRAFT BANK AND TURN CONTROL SYSTEM
Filed Aug. 23, 1944

INVENTOR.
CARL G. NYMAN
BY Frank H. Harmon
ATTORNEY

Patented June 14, 1949

2,472,918

UNITED STATES PATENT OFFICE 2,472,918

AIRCRAFT BANK AND TURN CONTROL SYSTEM

Carl G. Nyman, Shaker Heights, Ohio, assignor, by mesne assignments, to Jack & Heintz Precision Industries, Inc., Cleveland, Ohio, a corporation of Delaware Application August 23, 1944, Serial No. 550,841

9 Claims. (Cl. 244—79)

1

This invention relates in general to automatic pilots and more particularly to bank and turn control devices.

One of the primary objects of the invention is to provide an improved bank and turn control device wherein two separate hand controls may be employed for separate aileron and rudder trim and a single gyro and single hand control utilized to initiate and effect a combined rudder and aileron control for a predetermined rate of airplane turn.

To this and other ends it is proposed for example in connection with the conventional pneumatic-hydraulic automatic pilot aileron and rudder systems to employ a single gyro which is mounted in a gimbal support constrained to one axis of movement. Conventional air pick-offs are employed for the rudder and aileron air relays but they are so mounted as to be jointly operated by the gyro gimbal as it moves in either direction relative to the gyro spin axis. After the rudder and aileron are separately trimmed the coordinated turn knob is set which resiliently biases the gyro gimbal in either direction. Suitable separate differential gear trains are employed to permit individual aileron and rudder trim, the proper operation of the rudder and aileron follow-up systems and the combined operation of the rudder and aileron air pick-offs by the coordinated turn knob.

Figure 1:
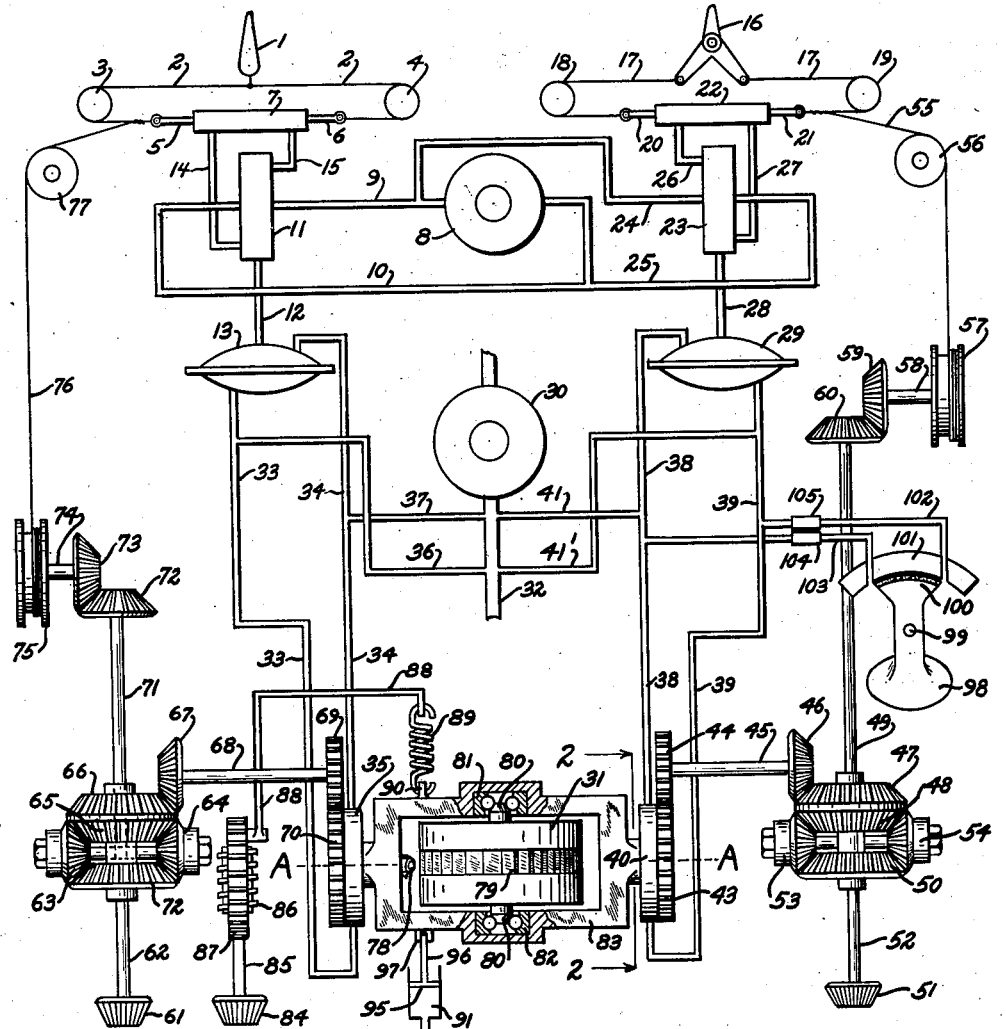
Figure 2:
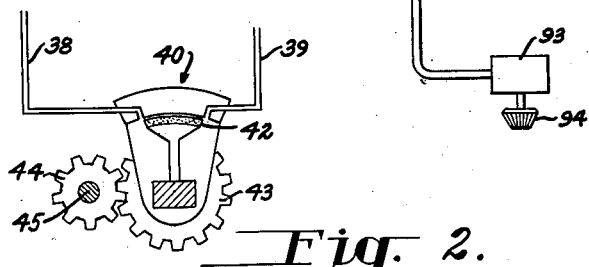

With the foregoing and other objects in view, the invention resides in the combination of parts and in the details of construction hereinafter set forth in the following specification and appended claims, certain embodiments thereof being illustrated in the accompanying drawings, in which:

Figure 1 is a schematic illustration of the airplane rudder and ailerons and the pneumatic-hydraulic control systems therefor, the constrained gyro and the rudder and aileron pick-offs separately operated by the rudder and aileron trim knobs and jointly operated by the coordinated turn knob, the separate rudder and aileron follow-up systems and the differential gear trains permitting the independent operations of the air pick-offs by such control knobs and follow-up systems; and Figure 2 is a view in section taken along line 2—2 of Figure 1 showing the aileron air pick-off and gear operating means, the rudder air pick-off and operating means being the same.

Referring more particularly to the drawings, the rudder 1 is operated in either direction by cables 2 that extends about pulleys 3 and 4 connected to piston rods 5 and 6 of the usual piston of a hydraulic servo unit 7. The hydraulic system includes pressure oil pump 8 with lines 9 and 10 leading to the usual balanced oil valve 11 which is actuated by a shaft 12 in either direction by the flexible diaphragm of the usual air relay 13, the oil lines from the balanced oil valve to either side of the servo piston being shown at 14 and 15. Likewise the airplane aileron 16 is operated in either direction by cables 17 passing about pulleys 18 and 19 attached to piston rods 20 and 21 of the piston of the usual hydraulic servo unit 22. The hydraulic system also includes the usual balanced oil valve 23 with lines 24 and 25 leading to the same single oil pump 8 which also supplies rudder oil valve 11. Lines 26 and 27 lead from oil valve 23 to either side of the piston of servo 22. Oil valve 23 is operated in either direction by a shaft 28 connected to the flexible diaphragm of the usual air relay 29.

The pneumatic system of the rudder and aileron controls may include a single vacuum pump 30 for evacuating the gyro box to permit in-rushing air to spin the gyro wheel 31 by means to be later described. In circuit with vacuum pump 30 through pipe 32, shown broken away, are both the rudder and aileron pneumatic control systems. For instance, air tubes 33 and 34 extend from opposite sides of the diaphragm of the rudder air relay 13 to the rudder air pick-off assembly, generally indicated at 35 in Figure 1, while air tubes 36 and 37 lead from tubes 33 and 34 to tube 32. Likewise in the aileron pneumatic system air tubes 38 and 39 lead from opposite sides of the diaphragm of air relay 29 to the aileron air pick-off assembly, generally indicated in Figure 1 at 40, while air tubes 41 and 42 connect tubes 38 and 39 to tube 32.

The two air pick-off assemblies 35 and 40 are the same and are operated in the same manner, the aileron pick-off being shown in Figure 2 to include an air pick-off bracket 40 to support air tubes 38 and 39 whose adjacent ends are normally open to the atmosphere to admit in-rushing air as the gyro box is being evacuated by vacuum pump 30. The means for valving this in-rushing air through the open ends of tubes 38 and 39 comprises a rotatably mounted shroud 42 which is shown in neutral with both tubes 38 and 39 open but which when rotated partially or completely closes one tube while partially or completely opening the other tube. Valve 40 is rigid with a gear 43 meshing with a gear 44 carried by a shaft 45 having a bevel gear 46 that meshes with a bevel gear 47 of a differential gear assembly. This may include a bevel gear 48 rigid with bevel gear 47 and loosely mounted on shaft 49 which has fixed thereto a bevel gear 50. The aileron trim knob 51 rotates a shaft 52 which is rigid with pinion gears 53 and 54 that mesh with bevel gears 48 and 50. The aileron follow-up system includes a cable 55 passing about pulley 56 and about the follow-up pulley 57 to rotate shaft 58 carrying a bevel gear 59 meshing with a bevel gear 60 to rotate shaft 49 in either direction. Likewise there is provided a rudder trim knob 61 having a shaft 62 rigid with differential pinion gears 63 and 64 which mesh with bevel gear 65 rigid with bevel gear 66 meshing with bevel gear 67 on shaft 68 to rotate gear 69 meshing with gear 70 to rotate the shroud of rudder pick-off 35, in the same manner as the aileron pick-off shroud as shown in Figure 2, to regulate the closing and opening of tubes 33 and 34 to in-rushing air. Gears 65 and 66 may be loose on shaft 71 which is rigid with bevel gear 72. Shaft 71 carries a bevel gear 72 meshing with bevel gear 73 rigid with shaft 74 rotating with the rudder follow-up pulley 75 to which is secured the follow-up cable 76 extending about pulley 77 to the rudder cable 2.

The gyro rotor 31, as is customary in an air driven rotor, is mounted in the usual gyro box, not shown, to be evacuated in the usual manner by vacuum pump 30 to draw in high speed in-rushing air through a nozzle 78 to impinge on the rotor buckets 79 to spin the rotor on its pivots 80 and about an axis normally coincidental with the longitudinal axis of the aircraft. Pivots 80 rotate in bearing assemblies 81 and 82 in gimbal frame 83 which latter is mounted in a suitable stationary support (not shown) to be constrained to rotative movement in a single plane about an axis at right angles to the rotor axis and transverse of the aircraft and indicated in dotted lines as A—A. As stated before, the aileron air pick-off shroud 42 as well as the corresponding shroud of the rudder air pick-off shroud are both secured to the gimbal 83 to be moved jointly in either direction as the gimbal is moved relatively to the rotor spin axis.

The above described construction permits independent manual trim of the rudder and ailerons by knobs 61 and 51 to cause rotation of gears 70 and 43 in either direction to move the rudder and aileron air pick-offs 35 and 40 with respect to their shrouds. It also permits of movement of these air pick-offs responsively to the two follow-up systems.

Such a construction and arrangement lends itself to be adaptable for a coordinated application of rudder and aileron for a predetermined rate of turn. After rudder and aileron trim it is proposed to initiate such a turn by use of a single turn knob 84 on a shaft 85 to rotate a worm gear 86 meshing with a ring gear 87 for rotating an angle arm 88. This arm has attached thereto an adjustable centralizing tension coil spring 89 the other end of which is attached to a loop 90 fixed to gimbal 83, the spring being of predetermined tensile strength. Thus, a turning of knob 84 in either direction resiliently biases the gimbal with respect to the rotor spin axis and accordingly moves the two shrouds with respect to the rudder and aileron air pick-offs to initiate a joint application of rudder and aileron for a predetermined rate of turn and at the same time permitting the rudder and aileron follow-up systems to operate in the conventional manner to move the air pick-offs with respect to their shrouds.

As a matter of refinement there may also be provided a dash pot including a cylinder 91 in communication through a tube 92 to a box 93 with a suitable air bleed to be regulated by a control knob 94. The piston 95 of the dash pot has its piston rod 96 pivotally connected at 97. In this manner the movements of the gimbal relatively to the rotor spin axis may be effectively damped to an adjusted degree.

Additionally and for long period signals there is provided a gravity operated pendulum 98 pivotally suspended at 99 and whose upper end is formed in the shape of a shroud 100 for regulating the air pick-off 101 and the entrance of in-rushing air through tubes 102 and 103. These tubes are provided with air bleeds 104 and 105 and communicate with tubes 38 and 39 extending between the aileron air relay 29 and the aileron air pick-off 40.

It is to be understood that the foregoing is not a complete description of an automatic pilot, inasmuch as no disclosure is made of the elevator control which is a separate part of the complete automatic pilot.

In summary, the gyro rotor spin axis is coincidental with the aircraft longitudinal axis and the pivot axis of the gimbal is transverse thereto. Rudder trim is mechanically effected by control knob 61 and aileron trim by knob 51.

Insofar as the gyro itself is concerned, it is responsive only to yaw, or turn, and is not responsive to roll or pitch. When the aircraft yaws, or turns, from a set course the gyro precesses and a signal is given simultaneously to the rudder pick-off 35 and the aileron pick-off 40 to simultaneously apply counter rudder and aileron.

When the aircraft rolls from a set course the gyro, having its spin axis coincidental with the longitudinal axis of the aircraft and its gimbal axis transverse thereto, is not effected and performs no function in righting the aircraft to its set course. However, when such roll occurs, the pendulum 98, being pivoted on an axis 99 coincidental with the longitudinal axis of the aircraft, operates pick-off 100 to effect counter aileron control.

Also, inasmuch as the gyro spin axis is coincidental with the longitudinal axis of the aircraft and the gimbal axis transverse thereto, and since the gyro is restrained by spring 89 it is not materially affected by pitch of the aircraft from a set course and has no effect on either the aileron or rudder servo systems.

The rudder and aileron trim having been accomplished by knobs 61 and 51, respectively, a set course of combined rudder and aileron, for proper non-skidding aerial maneuver, is set through the gyro by control knob 84.

From the foregoing it will be seen that there has been provided a simple and effective automatic bank and turn control system employing a single constrained gyro and a single control knob for setting a joint rudder and aileron application for a predetermined rate of turn after independent rudder and aileron trim while permitting the operation of the rudder and aileron follow-up systems in the desired manner. It is, of course, to be understood that the system described as applied to the conventional pneumatic-hydraulic automatic pilot is equally applicable to an automatic pilot wherein the gyro rotor is hydraulically or electrically driven.

I claim:
1. In an automatic pilot for an aircraft having a rudder and aileron, servos for driving said rudder and aileron, a single gyro and a single axis gimbal therefor to constrain the gyro to one degree of freedom, a rudder pick-off and an aileron pick-off mounted on said gimbal axis to be operated by said gimbal in its single plane movements, separate manual means for operating each of said pick-offs for aileron and rudder trim independently of each other and said gimbal and separate means for adjusting said gimbal to jointly operate both of said pick-offs to jointly energize both of said servos to initiate a combined rudder and aileron operation for effecting a predetermined rate of turn.

2. In an automatic pilot for an aircraft having a rudder and an aileron, servos for driving said rudder and aileron, a single gyro and a single axis gimbal therefor to constrain the gyro to one degree of freedom, resilient means for biasing the single gimbal, a rudder pick-off and an aileron pick-off mounted on said gimbal axis to be operated by said gimbal in its movements, separate manual means for operating each of said pick-offs for aileron and rudder trim independently of each other and said gimbal and separate means for adjusting said gimbal through said resilient biasing means to jointly operate both of said pick-offs to jointly energize both of said servos to initiate a combined rudder and aileron operation for effecting a predetermined rate of turn.

3. In an automatic pilot for an aircraft having a rudder and an aileron, servos for driving said rudder and aileron, a single gyro and a single axis gimbal therefor to constrain the gyro to one degree of freedom, a rudder pick-off and an aileron pick-off mounted on said gimbal axis to be operated by said gimbal in its single plane movements, separate manual control means for operating each of said pick-offs for aileron and rudder trim independently of each other and said gimbal and separate means for adjusting said gimbal to jointly operate both of said pick-offs to jointly energize both of said servos to initiate a combined rudder and aileron operation for effecting a predetermined rate of turn, and rudder and aileron follow-up systems for operating said aileron pick-off and said rudder pick-off independently of each other and independently of the manual control means for independent operation of the pick-offs and independently of the manual control means for combined operation thereof.

4. In an automatic pilot for an aircraft having a rudder and an aileron, servos for driving said rudder and said aileron, a single gyro and a single axis gimbal therefor to constrain the gyro to one degree of freedom, a rudder pick-off and an aileron pick-off mounted on said gimbal axis to be operated by said gimbal in its movements, separate manual control means for operating each of said pick-offs for aileron and rudder trim independently of each other and said gimbal and separate manually operable means and spring means connecting the same with said gimbal for adjusting said gimbal to jointly operate both of said pick-offs to jointly energize both of said servos to initiate a combined rudder and aileron operation for effecting a predetermined rate of turn, and rudder and aileron follow-up systems for operating said aileron pick-off and said rudder pick-off independently of each other and independently of the manual control means for independent operation of the pick-offs and independently of the manual control means for combined operation thereof.

5. In an automatic pilot for an aircraft having a rudder and an aileron, servos for driving said rudder and said aileron, common power means for operating both of said servos and separate pick-offs for controlling the flow of power from said power means to individually operate said rudder and aileron servos, a single gyro assembly including a gyro wheel mounted in a single axis gimbal that is mounted for one axis of rotation only, one element of each of said pick-offs being connected to said gimbal to be operated thereby about the axis of said gimbal and manual means for separate operation of each of the other pick-off elements for rudder and aileron trim respectively and a single manual control means for resiliently biasing said gimbal to jointly move the pick-off elements connected to said gimbal to jointly apply rudder and aileron control to set and control a predetermined rate of turn.

6. In an automatic pilot for an aircraft having a rudder and an aileron, servos for driving said rudder and aileron, common power means for operating both of said servos and separate pick-offs for controlling the flow of power from said power means to individually operate said rudder and aileron servos, a single gyro assembly including a gyro wheel mounted in a gimbal that is mounted for one axis of rotation only, one element of each of said pick-offs being connected to said gimbal to be operated thereby about the axis of said gimbal and manual means for separate operation of each of the other pick-off elements for rudder and aileron trim respectively, a rudder follow-up system and an aileron follow-up system for separately operating said last-named pick-off elements and a differential gear train between each of said manual trim controls and corresponding follow-up systems so that the rudder and aileron manual trim controls may be operated independently of the follow-up systems, and a single manual control means for resiliently biasing said gimbal to jointly move the pick-off elements connected to said gimbal to jointly apply rudder and aileron control to set and control a predetermined rate of turn.

7. In an automatic pilot for an aircraft having a rudder and an aileron, servos for driving said rudder and aileron, common power means for operating both of said servos and separate pick-offs for controlling the flow of power from said power means to individually operate said rudder and aileron servos, a single gyro assembly including a gyro wheel mounted in a gimbal mounted for one axis of rotation only, one element of each of said pick-offs being connected to said gimbal to be operated thereby about the axis of said gimbal and manual means for separate operation of each of the other pick-off elements for rudder and aileron trim respectively, and a single manual control means for resiliently biasing said gimbal to jointly move the pick-off elements connected to said gimbal to jointly apply rudder and aileron control to set and control a predetermined rate of turn.

8. In an automatic pilot for an aircraft having a rudder and an aileron, servos for driving said rudder and aileron, common power means for operating both of said servos and separate pick-offs for controlling the flow of power to said power means to individually operate said rudder and aileron servos, a single gyro assembly including a gyro wheel mounted in a gimbal that is mounted for one axis of rotation only, one element of each of said pick-offs being connected to said gimbal to be operated thereby about the axis of said gimbal and manual means for separate operation of each of the other pick-off elements for rudder and aileron trim respectively, a rudder follow-up system and an aileron follow-up system for respectively and separately operating said last-named pick-off elements independently of manual operation thereof, and a single manual control means for resiliently biasing said gimbal to jointly move the pick-off elements connected to said gimbal to jointly apply rudder and aileron control to set and control a predetermined rate of turn.

9. In an automatic pilot for an aircraft having a rudder and an aileron, servos for driving said rudder and aileron, common power means for operating both of said servos and separate pick-offs for controlling the flow of power to said power means to individually operate said rudder and aileron servos, a single gyro assembly including a gyro wheel mounted in a single gimbal, mounted for one axis of rotation only, one element of each of said pick-offs being connected to said gimbal to be operated thereby about the axis of said gimbal and manual means for separate operation of each of the other pick-off elements for rudder and aileron trim respectively, a rudder follow-up system and an aileron follow-up system for respectively and separately operating said last-named pick-off elements and a differential gear train between each of said manual trim controls and the corresponding follow-up systems so that the rudder and aileron manual trim controls may be operated independently of the follow-up systems, and a single manual control means for resiliently biasing said gimbal to jointly move the pick-off elements connected to said gimbal to jointly apply rudder and aileron control to set and control a predetermined rate of turn.

CARL G. NYMAN.

REFERENCES CITED

The following references are of record in the file of this patent:

UNITED STATES PATENTS

| Number | Name | Date |
|---|---|---|
| 1,825,994 | Cooke | Oct. 6, 1931 |
| 1,992,086 | Meredith et al. | Feb. 19, 1935 |
| 2,066,194 | Bates | Dec. 29, 1936 |
| 2,199,256 | De Florez | Apr. 30, 1940 |
| 2,325,108 | Carlson | July 27, 1943 |